United States Patent [19]

Hewitt

[11] Patent Number: 5,790,811

[45] Date of Patent: Aug. 4, 1998

[54] SYSTEM AND METHOD FOR PERFORMING DATA TRANSFERS DURING PCI IDLE CLOCK CYCLES

[75] Inventor: Larry Hewitt, Austin, Tex.

[73] Assignee: Advanced Micro Devices, Inc., Sunnyvale, Calif.

[21] Appl. No.: 649,245

[22] Filed: May 17, 1996

[51] Int. Cl.[6] .............................. G06F 13/12; G06F 13/42

[52] U.S. Cl. ......................... 395/285; 395/286; 395/287; 395/290

[58] Field of Search ........................... 395/285, 286, 395/287, 290, 293

[56] References Cited

U.S. PATENT DOCUMENTS 5,517,625   5/1996   Takahashi ............................ 395/288

OTHER PUBLICATIONS

Peripheral Component Interconnect (PCI) Local Bus Specification, Revision 2.0, Apr. 30, 1993, pp. 9–46.

Primary Examiner—Glenn A. Auve
Assistant Examiner—Jeffrey K. Seto
Attorney, Agent, or Firm—Conley, Rose & Tayon; B. Noel Kivlin

[57] ABSTRACT

A computer system and method for performing data transfers during idle PCI clock cycles. The computer system includes a PCI bus, a plurality of devices coupled to the bus, and a bus arbiter coupled to the bus. One of the plurality of devices is a source device, such as a CD-ROM drive controller, and one of the plurality of devices is a destination device, such as an MPEG video decoder. The system further includes a source ready signal, a destination ready signal and an idle acknowledge signal each coupled to the bus arbiter, the source device and the destination device. The source device asserts the source ready signal when the source device is ready to send data to the destination device. The destination device asserts the destination ready signal when the destination device is ready to receive data from the source device. The bus arbiter asserts the idle acknowledge signal when each of the plurality of bus request signal and bus grant signal pairs is deasserted and the bus is idle. The source device sends data to the destination device on the next clock after each of the source ready, destination ready and idle acknowledge signals are asserted.

12 Claims, 5 Drawing Sheets

5,790,811

SYSTEM AND METHOD FOR PERFORMING DATA TRANSFERS DURING PCI IDLE CLOCK CYCLES

BACKGROUND OF THE INVENTION

1. Field of the Invention

This invention is related to the efficiency of system bus utilization and in particular to utilizing idle clock cycles of system buses to improve efficiency.

2. Description of the Relevant Art

Many computer systems comprise a system bus, or expansion bus, to couple other system elements together and enable the transfer of data between the other system elements. An example of such an expansion bus is the popular Peripheral Component Interconnect (PCI) bus.

Many systems which employ a bus provide a bus arbiter which resides on the bus. Other devices on the bus, referred to as masters, request ownership, or mastership, of the bus in order to perform data transfers on the bus. The arbiter performs arbitration of the devices requesting mastership of the bus by granting mastership of the bus to one of the devices which is requesting bus mastership. Once a device is granted mastership of the bus by the arbiter, the device performs the desired data transfer within the maximum bus latency limits specified by the bus standard.

Once the device having bus mastership, also referred to as the bus master, has completed the data transfer or encountered the maximum bus latency limit, the bus master relinquishes mastership of the bus and the bus becomes free for other devices to arbitrate. If no devices on the bus request mastership of the bus and no data transfers are occurring on the bus then the bus is in an idle state.

In the case where a device requests mastership of the bus and loses the arbitration, the device must request mastership of the bus again when the bus returns to the idle state if the device still desires mastership of the bus. The device may lose arbitration again on the next try, and in fact lose arbitration on many more consecutive attempts. The time from when a device requests mastership of the bus to when the device is granted mastership of the bus is called the arbitration latency, or latency. For any given attempt to arbitrate for mastership of the bus, the latency may vary according to a number of factors such as the sizes of the data transfers performed, the number of devices requesting mastership of the bus, the relative priorities, if any, of the devices on the bus and the arbitration scheme employed by the bus arbiter.

Some devices on the bus have real-time constraints regarding the transfer of data to or from the devices. FIG. 1 shows a portion of a computer system 100 in which a CD-ROM drive 110 source device is providing data to an MPEG video decoder 120 destination device across a PCI bus 130. The CD-ROM drive 110 has two output buffers 112A and 112B (referred to collectively as 112), or queues. The MPEG decoder 120 has an input buffer 122, or FIFO. Data is transferred from the CD media to the first output buffer 112A. When the first output buffer 112A becomes full, the drive 110 requests ownership of the PCI bus 130. When the drive 110 obtains bus mastership the drive 110 transfers the data from the first output buffer 112A to the input buffer 122 of the MPEG decoder in one or more large burst transfers. The MPEG decoder 120 fetches data from the input buffer 122 and decodes the data for video display. Meanwhile, data is being transferred from the media into the second output 112B buffer. When the second output buffer 112B becomes full, the drive requests ownership of the PCI bus 130 and transfers the data while the first output buffer 112A is being filled.

The drive 110 "ping-pongs" back and forth between the output buffers 112 transferring data to the decoder 120. The blocks of video data are typically arranged in sequential order on the media. The drive 110 performs read-ahead operations, constantly filling the output buffers at a characteristic data rate.

In this scenario two real-time constraints must be considered regarding arbitration latency and bus efficiency. The first consideration is that if data is not supplied to the decoder 120 at a sufficient rate, the video displayed will be degraded. If the bus 130 is inefficiently used, the required data rate may not be achieved.

The second consideration is that if the data is not emptied from the output buffers 112 of the drive 110 at a sufficient rate, due to inefficient bus utilization or large bus latencies for example, then the drive 110 must cease its read-ahead operations and therefore "miss" a revolution of the drive 110. That is, the next block of data will have already passed under the read head of the drive 110 and therefore the drive 110 will have to incur an entire revolution of the media in order to read the next block. The duration of a single revolution is often relatively large enough to cause infidelity in the video due to data not being supplied to the decoder 120 at a sufficient rate.

To minimize the impacts of real-time constraints, two techniques are commonly employed. First, the sizes of the output buffers 112 and input buffers 122 are typically chosen to be relatively large, since the maximum latency able to be tolerated by a device is inversely proportional to the buffer size. However, the larger the buffers the greater the cost of the devices and consequently the cost of the system in which the devices are employed.

Second, the data transfers are performed in relatively large bursts. This minimizes the effects of the bus arbitration cycles during which no data is transferred and thus increases the efficiency on the bus and throughput between the source device and destination device. However, these large bursts have the side effect of increasing the latency for other devices desiring to obtain mastership of the bus, thus reducing the responsiveness of the system and potentially requiring the other devices to employ large buffers and consequently increasing the system cost.

Finally, it has been observed that in many real-time systems, a common pattern of bus utilization is for one or more adjoining large burst data transfers to occur, such as previously described, interspersed with periods of idle clock cycles, i.e., clock cycles when the bus is in the idle state. This pattern is illustrated in FIG. 2 in which percentage bus utilization is plotted as a function of time. These idle clock cycle periods are essentially wasted bus cycles and contribute nothing to the performance of the system.

Therefore a method for transferring data during idle clock cycles in order to reduce the typical arbitration latency of the PCI bus thus improving the efficiency and responsiveness of the bus and reducing the cost of the system by allowing smaller buffers to be employed is desired.

SUMMARY OF THE INVENTION

The present invention comprises a computer system and method for performing data transfers during idle PCI clock cycles. The computer system comprises a PCI bus, a plurality of devices coupled to the bus, and a bus arbiter coupled to the bus. Each of the plurality of devices which is capable of being a bus master is coupled to the arbiter by a bus request and bus grant signal pair as required by the PCI specification. One of the plurality of devices is a source device, such as a CD-ROM drive controller, and one of the plurality of devices is a destination device, such as an MPEG video decoder. The system further comprises a source ready signal, a destination ready signal and an idle acknowledge signal each coupled to the bus arbiter, the source device and the destination device.

The source device is configured to assert the source ready signal when the source device is ready to send data to the destination device. The destination device is configured to assert the destination ready signal when the destination device is ready to receive data from the source device. The bus arbiter is configured to assert the idle acknowledge signal when each of the plurality of bus request signal and bus grant signal pairs is deasserted and the bus is idle. The source device sends data to the destination device on the next clock after each of the source ready, destination ready and idle acknowledge signals are asserted. These idle cycle data transfers may continue during successive clock cycles as long as the source ready, destination ready and idle acknowledge signals are asserted.

An alternate embodiment of the present invention is contemplated in which the destination device comprises a system memory and a memory controller coupled to the system memory and PCI bus. The memory controller comprises an address pointer register which stores an address and a buffer coupled between the bus and the system memory which receives the data from the source device. The memory controller transfers the data from the buffer to the system memory at the address stored in the address pointer register and increments the address after transferring the data from the buffer to the system memory. The system further comprises a CPU coupled to the PCI bus which programs the address into the address pointer register.

Thus, the present invention advantageously utilizes idle bus cycles to transfer data from a source device to a destination device thus potentially reducing the typical arbitration latency of the bus. By reducing the arbitration latency of the bus 310 the present invention potentially improves the efficiency and responsiveness of the bus and potentially reduces the cost of the system by allowing smaller buffers to be employed in the devices coupled to the bus.

BRIEF DESCRIPTION OF THE DRAWINGS

Other objects and advantages of the invention will become apparent upon reading the following detailed description and upon reference to the accompanying drawings in which.

Figure 1:
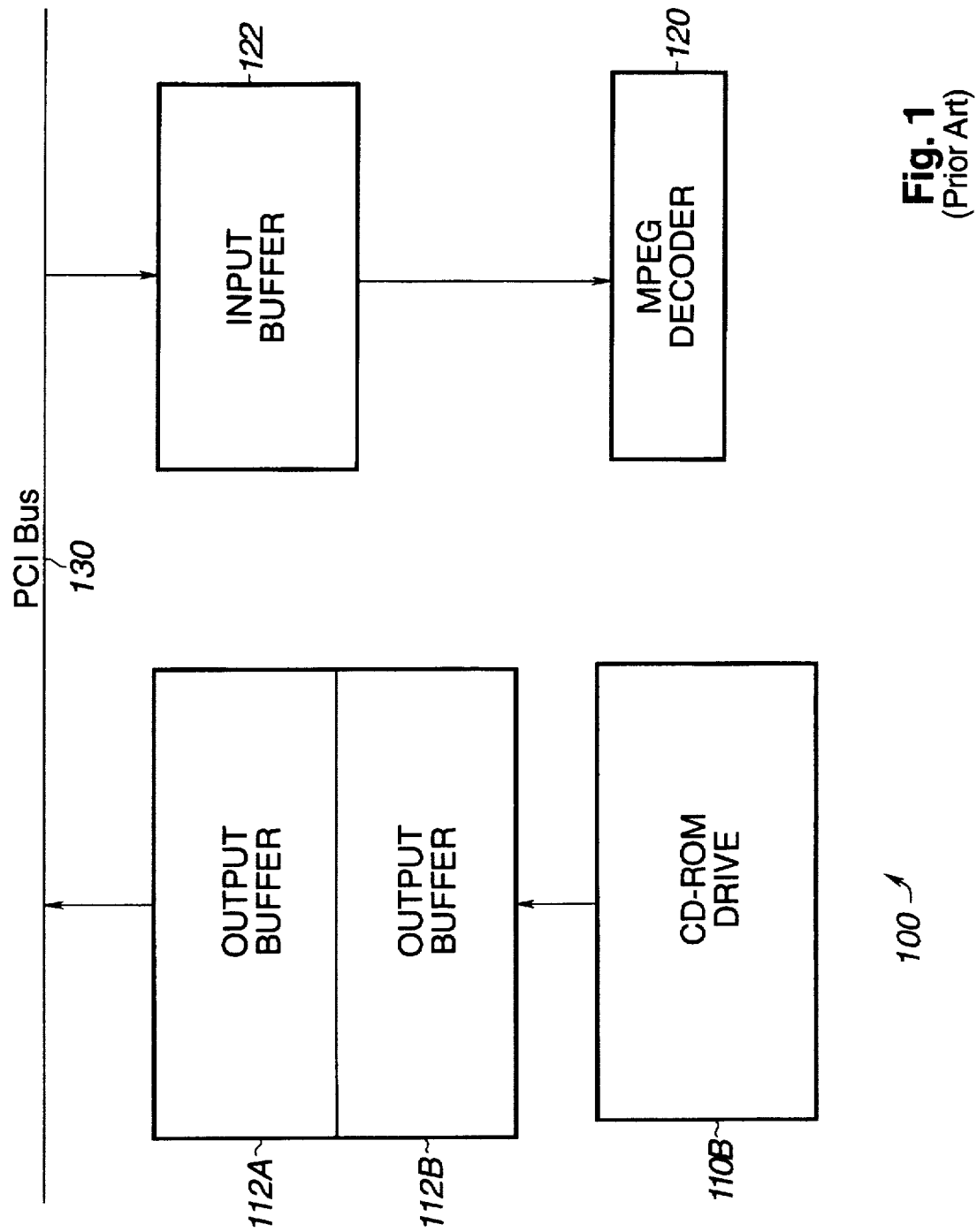
FIG. 1 is a block diagram of a portion of a computer system in which a CD-ROM drive is providing data to an MPEG video decoder across a PCI bus according to the prior art.
Figure 2:
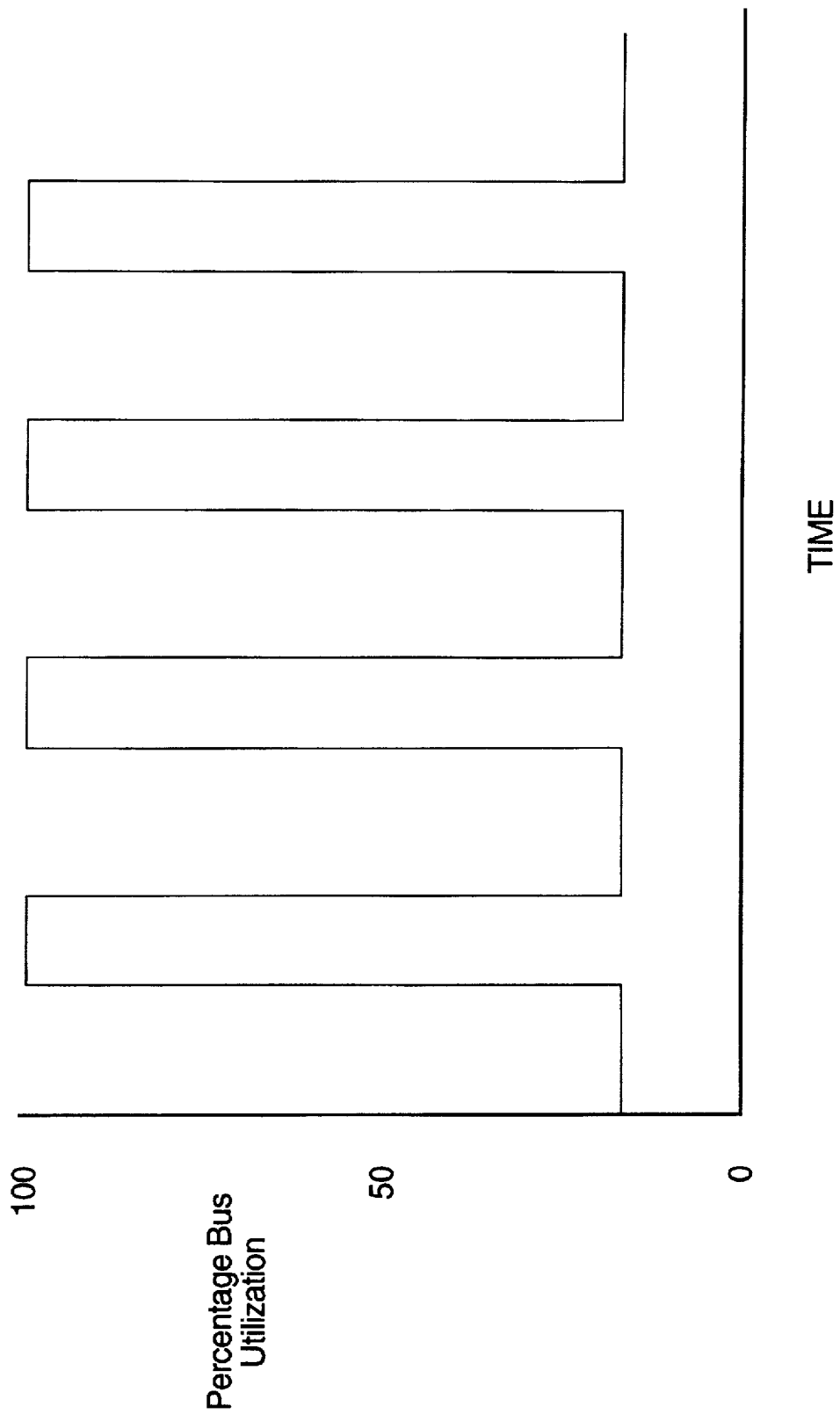
FIG. 2 is a graph of percentage bus utilization as a function of time illustrative of bus idle time according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
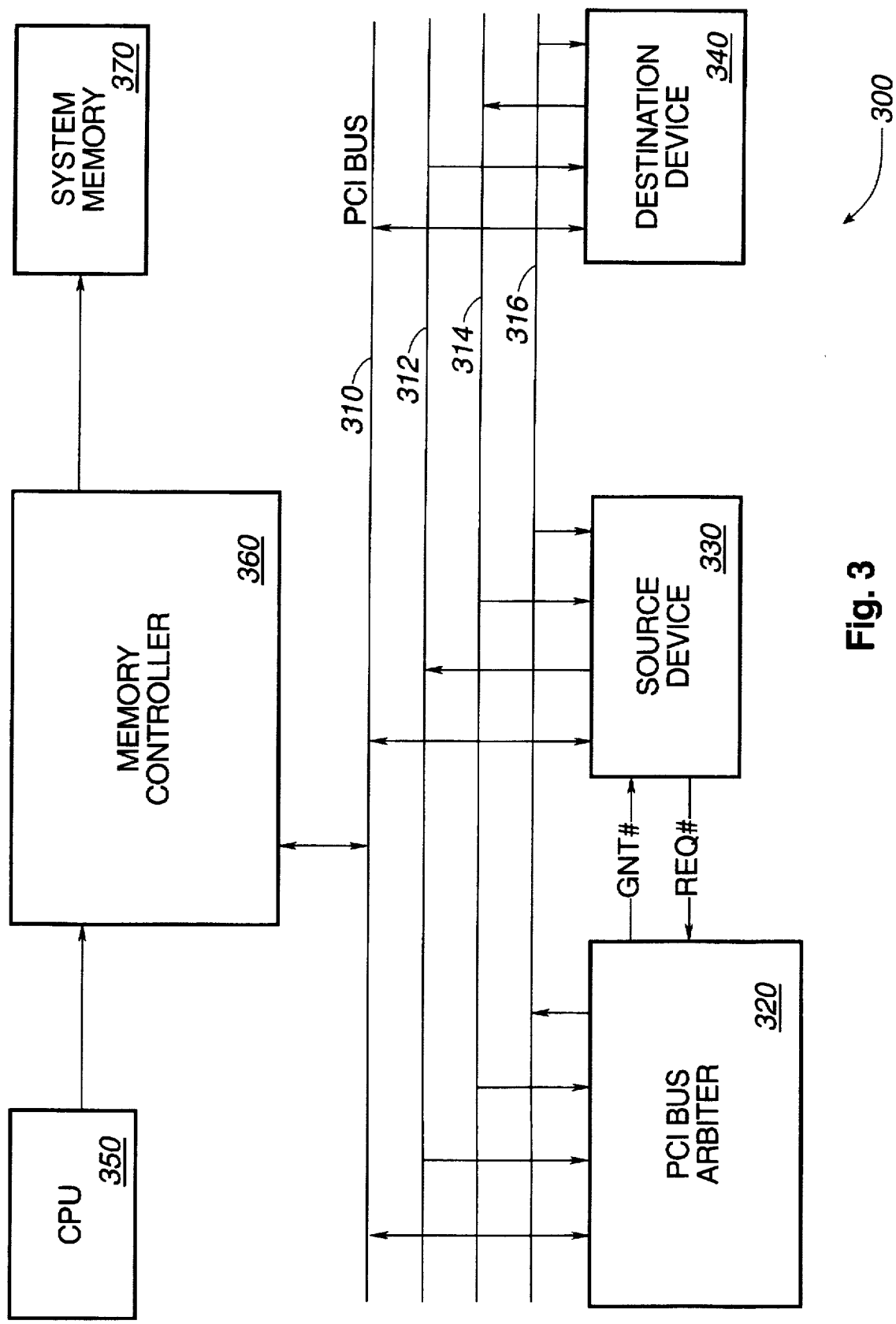
FIG. 3 is a block diagram of a computer system configured to perform idle cycle data transfers according to the present invention.

Referring now to FIG. 3, a block diagram of a computer system 300 configured to perform idle cycle data transfers according to the present invention is shown. The system 300 comprises a PCI bus 310 coupled to a PCI bus arbiter 320, a PCI source device 330, a PCI destination device 340, and a memory controller 360. Other PCI devices (not shown) may be coupled to the bus 310. A CPU 350 and system memory 370 are coupled to the memory controller 360. The arbiter 320 is coupled to the source device 330 by a PCI bus request (REQ#) and bus grant (GNT#) signal pair.

In addition to the signals defined by the PCI specification, the system 300 further comprises a source ready signal 312, a destination ready signal 314, and an idle acknowledge signal 316 each coupled to the source device 330, destination device 340, and arbiter 320. The present invention advantageously employs the source ready signal 312, the destination ready signal 314, and the idle acknowledge signal 316 along with other PCI bus 310 signals in combination with logic in the arbiter 320, source device 330 and destination device 340 to perform idle cycle data transfers.

The PCI bus 310 conforms to the PCI 2.0 specification or newer. In particular, the PCI specification specifies multiplexed address/data bus signals, a clock signal, and control signals among others. The control signals comprise a bus cycle frame (FRAME#) signal, an initiator ready (IRDY#) signal, and a target ready (TRDY#) signal. An idle cycle is defined by the PCI specification when both FRAME# and IRDY# are deasserted. When both FRAME# and IRDY# are deasserted the bus is said to be in the idle state. The present invention contemplates employing other expansion buses having similar characteristics as the PCI bus. The reader is referred to the PCI specification previously incorporated by reference for details about the operation of the PCI bus such as arbitration and data transfers.

The CPU 350, memory controller 360 and system memory 370 are illustrative of those components found in personal computers, workstation computers or any computer system which employs a PCI bus or an expansion bus with characteristics similar to a PCI bus.

The source device 330 is representative of a PCI bus master. PCI bus masters are configured to initiate bus transactions, i.e., to arbitrate for the bus 310 and transfer data to a target on the bus 310. Examples of the source device 330 are controllers which couple devices such as disk drives, CD-ROM drives, tape drives, scanners, video capture and/or encoding devices, or audio receiving devices to the PCI bus. Examples of such a controller are a SCSI-to-PCI host bus adapter and a PCI-IDE adapter. Another example of the source device 330 is a network interface card. Preferably the source device 330 comprises one or more output buffers (not shown) for buffering the data to be transferred to the destination device 340.

The destination device 340 is representative of a PCI target. PCI targets are configured to respond to bus transactions initiated by a master ,i.e., to receive data from a master on the bus 310. Examples of the destination device 340 are controllers which couple devices such as disk drives, tape drives, printers, video output and/or decoding devices, or audio output devices to the PCI bus. An example of such a controller is a SCSI-to-PCI host bus adapter. Another example of the destination device 340 is a network interface card. Preferably the destination device 340 comprises one or more input buffers (not shown) for buffering the data received from the source device 330.

When the source device 330 is ready to transfer data to the destination device 340, the source device 330 asserts the source ready signal 312 to indicate this condition. When the destination device 340 is ready to receive data from the source device 330 the destination device 340 asserts the destination ready signal 314 to indicate this condition. The arbiter 320 monitors the control signals on the bus 310, namely FRAME# and IRDY#, to determine the presence of an idle cycle on the bus 310. Additionally, the arbiter 320 monitors the bus request signals from each of the masters on the bus 310 to determine whether or not any of the masters are requesting mastership of the bus 310. Lastly, the arbiter 320 monitors the bus grant signals to each of the masters to determine if the arbiter 320 is granting mastership of the bus 310 to one of the masters.

The arbiter 320 asserts the idle acknowledge signal 316 when the bus 310 is idle (i.e., FRAME# and IRDY# are deasserted) and all REQ# and GNT# signals are deasserted. When the arbiter 320 asserts the idle acknowledge signal 316, if the source device 330 is asserting the source ready signal 312 and the destination device 340 is asserting the destination ready signal 314, the source device 330 sends valid data to the destination device 340 on the PCI address/ data (AD) signals on the next clock cycle and the destination device 340 latches the valid data from the AD signals on the next clock cycle after the idle acknowledge signal 316, source ready signal 312 and destination ready signal 314 are asserted.

As long as the idle acknowledge signal 316, source ready signal 312 and destination ready signal 314 are asserted the source device 330 continues to send data to the destination device 340 on the AD signals and the destination device 340 continues to latch the data from the AD signals. When the source device 330 is no longer ready to transfer data to the destination device 340, i.e., the output buffers of the source device 330 become empty, the source device 330 deasserts the source ready signal 312 on the clock cycle of the last valid data transfer to the destination device 340. Conversely, when the destination device 340 is no longer ready to receive data from the source device 330, i.e., the input buffers of the destination device 340 become full or near full, the destination device 340 deasserts the destination ready signal 314.

In the event that the bus 310 is so heavily utilized, i.e., not enough idle cycles exist, that the source device 330 is unable to significantly deplete its output buffers by performing idle cycle data transfers to the destination device 340 as the output buffers are being filled, the source device 330 resorts to requesting the bus 310 and performing normal bus master write transactions to the destination device 340 according to the PCI specification. When the source device 330 attempts to arbitrate for the bus 310, the source device 330 deasserts the source ready signal 312 to indicate to the destination device 340 that the source device 330 no longer desires to transfer data to the destination device 340 during idle cycles.

The emptier the output buffers of the source device 330 are kept by performing idle cycle data transfers, the less the source device 330 contributes to the overall latency of the bus 310. Thus the arbitration latency of the bus 310 is potentially substantially reduced. The source device 330 is alleviated from having to perform such large burst data transfers, i.e., large blocks of bus utilization, thus reducing the overall maximum latency of the bus 310.

Thus, the present invention advantageously utilizes idle bus cycles to transfer data from a source device to a destination device thus potentially reducing the typical arbitration latency of the bus 310. By reducing the arbitration latency of the bus 310 the present invention potentially improves the efficiency and responsiveness of the bus 310 and potentially reduces the cost of the system 300 by allowing smaller buffers to be employed in the devices coupled to the bus 310.

The present invention contemplates various means for determining when the source device 330 resorts to normal PCI write transactions to transfer data to the destination device 340 rather than using idle cycle data transfers. One means contemplated is a maximum latency timer maintained by the source device 330 which measures a number of clock cycles which have occurred since the source device 330 was ready to transfer data to the destination device 340. If the maximum latency timer reaches a value greater than a pre-determined amount of clock cycles, the source device 330 deasserts the source ready signal 312 and asserts its bus request signal to request mastership of the bus.

Another means is contemplated wherein when the output buffers of the source device 330 become a predetermined amount full the source device 330 deasserts the source ready signal 312 and asserts its bus request signal to request mastership of the bus. The predetermined amount full may be in terms of a percentage of the buffer which is full or a number of buffer entries full.

The present invention contemplates the source device 330 generating the byte enable (BE) signals of the PCI bus to specify to the destination device 340 which bytes of the AD signals contain valid data. The present invention also contemplates an embodiment in which the data transfers are required to be the size of an entire word on the bus 310.

Figure 4:
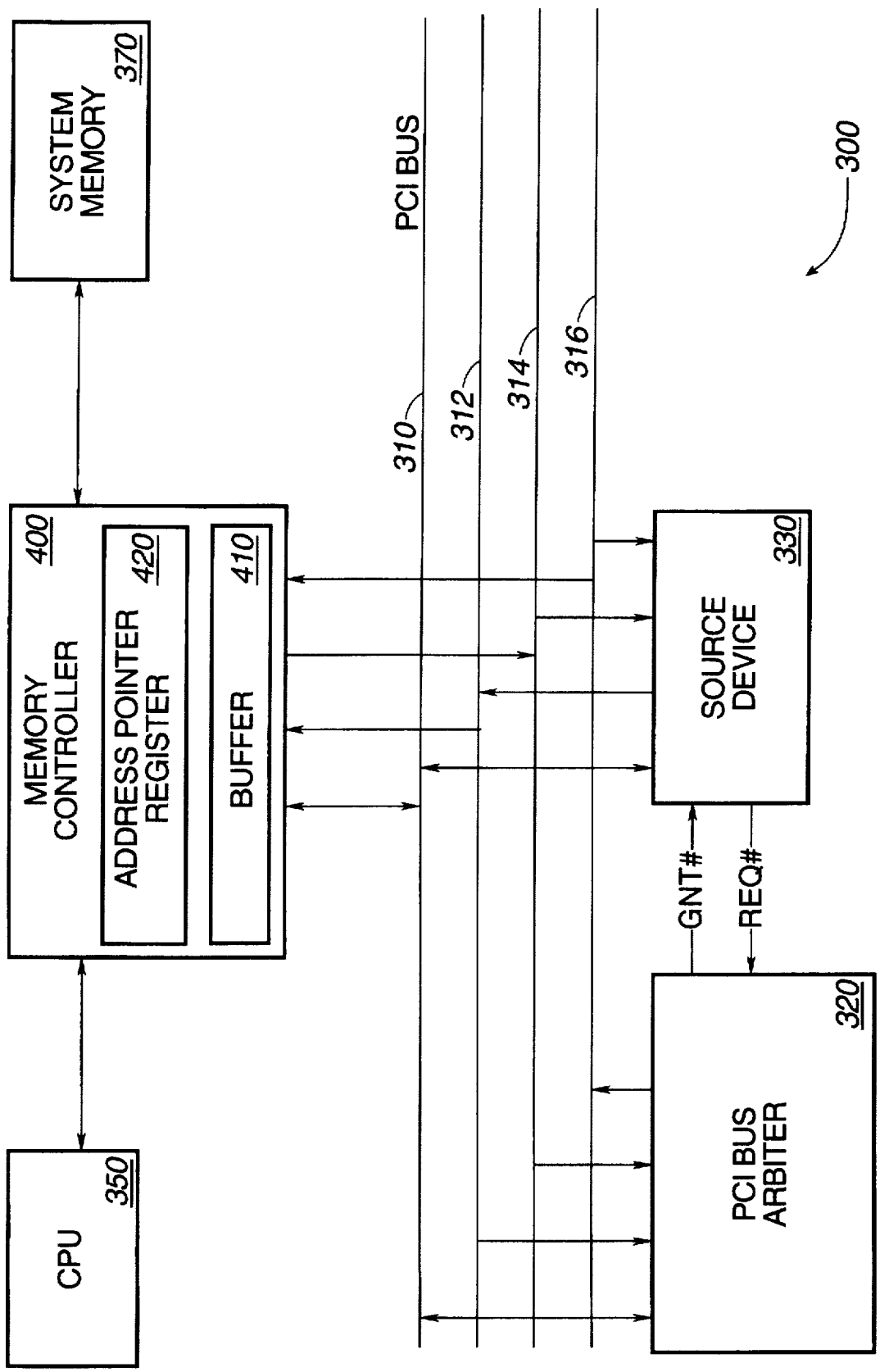
FIG. 4 is a block diagram of a computer system configured to perform idle cycle data transfers according to an alternate embodiment of the present invention.

Referring now to FIG. 4, a block diagram of a computer system 300 configured to perform idle cycle data transfers according to an alternate embodiment of the present invention is shown. The embodiment of FIG. 4 is similar to the embodiment of FIG. 3 and corresponding circuit portions are numbered identically for simplicity and clarity. The embodiment of FIG. 4 contemplates an enhanced memory controller 400 over the memory controller 360 of FIG. 3, in that the memory controller 400 acts as the destination device 340 of FIG. 3, i.e., the memory controller 400 receives idle cycle data transfers from the source device 330.

The memory controller 400 comprises a buffer 410 and an address pointer register 420. The CPU 350 programs the system memory 370 destination address for the data from the source device 330 into the address pointer register 420. The buffer 410 receives the data sent by the source device 330 from the bus 310. The memory controller 400 transfers the data from the buffer 410 to the system memory 370 at the destination address contained in the address pointer register 420. After each data transfer from the buffer 410 to system memory 370, the memory controller 400 increments the destination address in the address pointer register 420.

Figure 5:
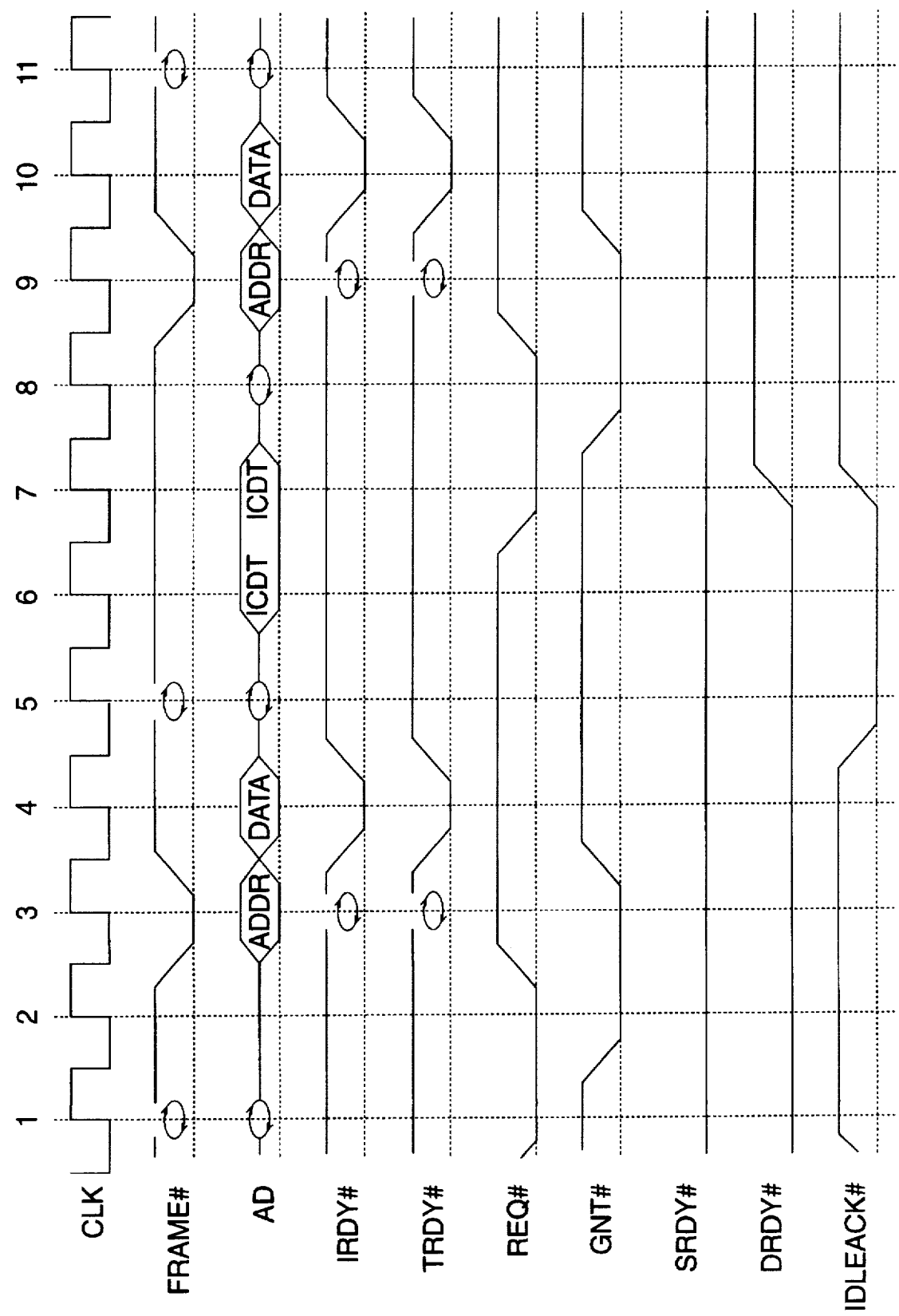
FIG. 5 is a timing diagram illustrating an idle cycle data transfer on a PCI bus according to the present invention.

Referring now to FIG. 5, a timing diagram illustrating an idle cycle data transfer on the PCI bus 310 (of FIG. 3) according to the present invention is shown. The standard PCI signals CLK, FRAME#, AD, IRDY#, TRDY# are shown. Eleven clock cycles are shown. Also shown is the bus request and grant signal pair, REQ# and GNT#, for a master which performs two write transactions with a target PCI device on the bus 310. The master and target are not shown in FIG. 3. One of the write transactions occurs before the idle cycle data transfer and the other write transaction occurs after the idle cycle data transfer. For the purposes of FIG. 5, the assumption is that no other masters which might be on the bus 310 are asserting their REQ# signals during clocks 1 through 11 and that the arbiter 320 is not asserting the GNT# signal for any of the other masters.

Additionally, the source ready signal 312, destination ready signal 314 and idle acknowledge signal 316 (of FIG. 3) are shown and are denoted as SRDY#, DRDY# and IDLEACK#, respectively.

The reader is referred to the PCI specification for detailed descriptions of the standard bus transactions which occur in FIG. 5. However, pertinent aspects of the bus transactions of FIG. 5 are described throughout the disclosure for clarity. The signals are sampled on the rising edge of CLK. Each rising CLK edge is denoted by a vertical dotted line and a corresponding integer at the top of the dotted line. Active low signals are denoted with a # at the end of the signal name. The bus turnaround cycles required by the PCI specification are indicated by two arrows pointing at each other's tail.

At clock 1, the source device 330 has asserted the SRDY# signal to indicate that it is ready to transfer data to the destination device 340. The destination device 340 has asserted the DRDY# signal to indicate that it is ready to receive data from the source device 330. The master has asserted the REQ# signal to request mastership of the bus 310. The arbiter 320 (of FIG. 3) deasserts IDLEACK# since not all of the bus request and grant signals are deasserted, even though the bus 310 is in the idle state, i.e., FRAME# and IRDY# are deasserted.

At clock 2 the arbiter 320 asserts the GNT# signal to grant to the master access to the bus 310.

At clock 3 the address phase of the write transaction occurs when the master asserts FRAME# and provides a valid address on the AD signals. The master deasserts REQ# to indicate that it no longer desires mastership of the bus 310. Since the GNT# signal is still asserted the arbiter 320 continues to deassert IDLEACK#.

At clock 4 the data phase of the write transaction occurs when the master asserts the IRDY# signal and the target asserts the TRDY# signal. The arbiter 320 continues to deassert IDLEACK# since the bus 310 is not in the idle state even though all of the bus request and grant signals are deasserted.

At clock 5 an idle cycle occurs, since FRAME# and IRDY# are deasserted and the write transaction between the master and target has completed. A bus turnaround cycle occurs on the AD signals. The arbiter 320 asserts IDLE-ACK# since all of the bus request and grant signals are deasserted and the bus 310 is in the idle state, i.e., FRAME# and IRDY# are deasserted.

At clock 6 an idle cycle data transfer occurs. The source device 330 places valid data on the AD signals and the destination device 340 latches the data from the AD signals.

At clock 7 another idle cycle data transfer occurs. The master asserts REQ# to request ownership of the bus 310. The arbiter 320 deasserts IDLEACK# in response to REQ# being asserted. The destination device 340 has deasserted DRDY# to indicate the last idle cycle data transfer, i.e., that it no longer is ready to receive data from the source device 330, presumably because its input buffer has become too full.

At clock 8 the arbiter 320 asserts GNT# to grant ownership of the bus to the master. A bus turnaround cycle occurs on the AD signals. The arbiter 320 continues to deassert IDLEACK# since not all of the bus request and grant signals are deasserted even though the bus 310 is in the idle state.

At clocks 9 through 11 the master performs a write transaction to the target like the write transaction of cycles 3 through 5.

The present invention contemplates an alternate embodiment with multiple sets of source and destination devices, each having respective source ready, destination ready and idle acknowledge signals. The arbiter enforces exclusive use of the bus by only asserting one of the idle acknowledge signals at a time.

Numerous variations and modifications will become apparent to those skilled in the art once the above disclosure is fully appreciated. It is intended that the following claims be interpreted to embrace all such variations and modifications.

What is claimed is:

1. A computer system, comprising:

a bus comprising a plurality of data lines, a plurality of bus request signal and bus grant signal pairs, a clock signal, one or more control signals configured to indicate a presence of an idle state of said bus;

a plurality of devices coupled to said bus, wherein a plurality of said plurality of devices is coupled to a respective one of said plurality of bus request signal and bus grant signal pairs, wherein a first of said plurality of devices is a source device and a second of said plurality of devices is a destination device; and a bus arbiter coupled to said bus;

a source ready signal, a destination ready signal and an idle acknowledge signal each coupled to said bus arbiter, said source device and said destination device;

wherein said source device is configured to assert said source ready signal when said source device is ready to send data to said destination device;

wherein said destination device is configured to assert said destination ready signal when said destination device is ready to receive data from said source device;

wherein said bus arbiter is configured to assert said idle acknowledge signal when each of said plurality of bus request signal and bus grant signal pairs is deasserted and said one or more control signals indicate said presence of said idle state of said bus; and wherein said source device is configured to send data to said destination device on said plurality of data lines and said destination device is configured to receive data from said source device on said plurality of data lines during a clock cycle in which said source ready signal, said destination ready signal and said idle acknowledge signal are asserted during the previous clock cycle.

2. The system of claim 1, wherein said source device is configured to send data to said destination device on said plurality of data lines and said destination device is configured to receive data from said source device on said plurality of data lines during successive clock cycles in which said source ready signal, said destination ready signal and said idle acknowledge signal are asserted during respective previous successive clock cycles.

3. The system of claim 1, wherein said bus is a PCI bus, wherein said plurality of data lines comprise the AD signals of the PCI bus, wherein said control signals comprise the FRAME# and IRDY# signals of the PCI bus, wherein said idle state comprises the FRAME# and IRDY# signals being deasserted.

4. The system of claim 3, wherein said source device is configured to generate the BE# signals of the PCI bus and said destination device is configured to receive the BE# signals of the PCI bus to specify which bytes of the AD signals of the PCI bus contain valid data.

5. The system of claim 1, wherein said destination device comprises:

a system memory; and a memory controller coupled to said system memory and said bias, comprising:

an address pointer register configured to store an address; and a buffer coupled between said bus and said system memory configured to receive said data from said source device;

wherein said memory controller is configured to transfer said data from said buffer to said system memory at said address, wherein said memory controller is configured to increment said address after transferring said data from said buffer to said system memory.

6. The system of claim 5, further comprising a CPU coupled to said bus, wherein said CPU is configured to program said address into said address pointer register.

7. A method for performing data transfers during idle cycles on a bus comprised in a computer system wherein said bus comprises a plurality of data lines, a plurality of bus request signal and bus grant signal pairs, a clock signal, one or more control signals configured to indicate a presence of an idle state of said bus, wherein the system further comprises a plurality of devices coupled to said bus, wherein a plurality of said plurality of devices is coupled to a respective one of said plurality of bus request signal and bus grant signal pairs, wherein a first of said plurality of devices is a source device and a second of said plurality of devices is a destination device, a bus arbiter coupled to said bus, a source ready signal, a destination ready signal and an idle acknowledge signal each coupled to said bus arbiter, said source device and said destination device, comprising:

said source device asserting said source ready signal when said source device is ready to send data to said destination device;

said destination device asserting said destination ready signal when said destination device is ready to receive data from said source device;

said bus arbiter asserting said idle acknowledge signal when each of said plurality of bus request signal and bus grant signal pairs is deasserted and said one or more control signals indicate said presence of said idle state of said bus;

said source device sending data to said destination device on said plurality of data lines during a clock cycle in which said source ready signal, said destination ready signal and said idle acknowledge signal are asserted during the previous clock cycle;

said destination device receiving said data from said source device on said plurality of data lines during said clock cycle in which said source ready signal, said destination ready signal and said idle acknowledge signal are asserted during the previous clock cycle.

8. The method of claim 7, wherein said source device sending and said destination device receiving are performed during successive clock cycles in which said source ready signal, said destination ready signal and said idle acknowledge signal are asserted during respective previous successive clock cycles.

9. The method of claim 7, wherein said bus is a PCI bus, wherein said plurality of data lines comprise the AD signals of the PCI bus, wherein said control signals comprise the FRAME# and IRDY# signals of the PCI bus, wherein said idle state comprises the FRAME# and IRDY# signals being deasserted.

10. The method of claim 9, further comprising:

said source device generating the BE# signals of the PCI bus and said destination device receiving the BE# signals of the PCI bus to specify which bytes of the AD signals of the PCI bus contain valid data during said source device sending data to said destination device.

11. The method of claim 7, wherein said destination device comprises a system memory and a memory controller coupled to said system memory and said bus, wherein said memory controller comprises an address pointer register configured to store an address and a buffer coupled between said bus and said system memory configured to receive said data from said source device, further comprising:

said memory controller transferring said data from said buffer to said system memory at said address after said destination device receiving data from said source device;

said memory controller incrementing said address after said transferring said data from said buffer to said system memory.

12. The method of claim 11, wherein said system further comprises a CPU coupled to said bus, further comprising:

said CPU programming said address into said address pointer register before said source device asserting said source ready signal.

* * * * *

UNITED STATES PATENT AND TRADEMARK OFFICE
CERTIFICATE OF CORRECTION

PATENT NO. : 5,790,811

DATED : August 4, 1998

INVENTOR(S) : Larry Hewitt

It is certified that error appears in the above-identified patent and that said Letters Patent is hereby corrected as shown below:

Claim 5, col. 9, line 10, please change [bias] to --bus--.

Signed and Sealed this

Seventeenth Day of November, 1998

Attest:

BRUCE LEHMAN

Attesting Officer

Commissioner of Patents and Trademarks